United States Patent [19]

Mettler

[11] Patent Number: 4,669,586
[45] Date of Patent: Jun. 2, 1987

[54] PIPE-TYPE HOUSING FOR A SHOCK ABSORBER PARTICULARLY OF THE TELESCOPIC VIBRATION DAMPER TYPE

[75] Inventor: Karl Mettler, Triesen, Liechtenstein

[73] Assignee: Etablissement Supervis, Vaduz, Liechtenstein

[21] Appl. No.: 660,660

[22] Filed: Oct. 15, 1984

[30] Foreign Application Priority Data

Oct. 21, 1983 [AT] Austria ............................... 3752/83

[51] Int. Cl.⁴ ............................................... F16F 9/54
[52] U.S. Cl. ........................... 188/322.19; 188/322.11
[58] Field of Search ...................... 188/322.19, 322.11; 403/157, 158, 159; 74/587, 588; 72/367

[56] References Cited

U.S. PATENT DOCUMENTS 3,679,029  7/1972  Thomas ........................ 188/321.11
4,480,730 11/1984  Koller et al. ................. 188/322.19

FOREIGN PATENT DOCUMENTS 2757232  7/1978  Fed. Rep. of
                 Germany ...................... 188/322.19
0080538  7/1981  Japan ........................... 188/322.19
0054750  4/1982  Japan ........................... 188/322.19

Primary Examiner—Duane A. Reger
Assistant Examiner—Alvin Oberley
Attorney, Agent, or Firm—Toren, McGeady and Goldberg

[57] ABSTRACT

A pipe-type housing for a shock absorber has a bearing eye at one end for a fastening member. The housing is formed of a welded or continuous seamless steel pipe formed at one end by hot or cold extrusion to provide a flattened portion with two spaced generally parallel surfaces. Each of the surfaces has an opening aligned with the opening in the other. A flange extends around each opening and projects inwardly relative to the flattened section toward the other flange, however, the flanges are spaced apart. In the deformation of the pipe a transition wall is formed between the flattened part and the remaining part with the normal pipe cross-section. A base is inserted into the normal pipe cross-section abutting the transition wall. The base is sealed with the inner circumferential surface of the pipe by a seal ring fitted into a circumferentially extending groove in the base. With the base inserted into the pipe, a groove is rolled in the pipe and is pressed into the groove in the base into contact with the seal ring.

2 Claims, 3 Drawing Figures

PIPE-TYPE HOUSING FOR A SHOCK ABSORBER PARTICULARLY OF THE TELESCOPIC VIBRATION DAMPER TYPE

BACKGROUND OF THE INVENTION

The invention is directed to a pipe-type or tubular housing for a shock absorber, in particular the telescopic-vibration damping type with a bearing eye arranged at one end for receiving a fastening member, wherein the bearing eye is formed of a part of the housing.

Such shock absorbers are mainly used in vehicles. As a rule, such shock absorbers are formed as one or two-tube dampers. The shock absorber is secured with a pin or buffer suspension in the part of the vehicle where vibrations are to be dampened. Usually a bearing eye for effecting the connection is provided in the housing of the shock absorber. Usually, the housing is made up of two separate manufactured parts subsequently welded together, that is, a pipe section and a base including the bearing eye. If the pipe-type housing includes the base, then the bearing eye must be subsequently attached to it. These known shock absorber constructions have proven to be effective in actual use, however, they are costly to manufacture.

SUMMARY OF THE INVENTION

Therefore, it is the primary object of the present invention to provide a shock absorber construction which can be manufactured at considerably less cost while maintaining the operational integrity of the absorber.

In accordance with the present invention, the pipe forming the housing for the shock absorber is made of continuous seamless or welded steel pipe. One end of a pipe section is pressed or deformed to provide two parallel surfaces spaced from one another with each of the surfaces containing an opening aligned with the other. Flanges extend around the opening in the inner part of the deformed section so that the flanges extend toward one another but are in spaced relation. In the deformation of the pipe section, one end of the housing assumes a rectangularly shaped box-like appearance with a transition wall located between the deformed section and the normal cross-section of the pipe section. A base is inserted in the normal cross-section pipe section into bearing contact with the transition wall. A seal is provided between the base and the inside surface of the pipe section.

A pipe-type housing for a shock absorber of the type described above can be formed from an axially extending section of steel pipe by cold or hot extrusion without the need for manufacturing two separate structural components which must then be connected together. In accordance with the invention, the pipe-type housing, aside from any punching or cutting operations needed to form the openings, can be effected by the above mentioned deformation operation which is extremely economical in terms of time and costs as compared to the previous manufacturing procedures.

Since external forces are introduced into the shock absorber through the openings serving as bearing eyes, it is important to form this part of the housing so that it is as stable and torsion-resistant as possible. Accordingly, another significant feature of the invention is that the deformed surfaces at one end of the pipe-type housing are shaped to provide a rectangularly shaped deformation of one end of the pipe housing with the parallel surfaces and lateral webs connecting the parallel surfaces combining to form a circumferentially closed axially extending box-like section.

As a rule, the pipe-type housing is obtained from one manufacturer and the base inserted into and sealed within the housing is obtained from another. To simplify the assembly procedure as much as possible, in accordance with the present invention, an inwardly projecting annular groove is formed in the pipe housing, in the normal cross-section part adjacent the transition wall and the groove engages within a corresponding circumferentially extending groove in the inserted base. A seal ring is positioned within the groove in the base and the groove pressed inwardly in the housing effects sealing contact with the seal ring. The groove in the pipe housing is a structural part formed during the assembly of the shock absorber, that is, after the base is inserted into the pipe-type housing. After the base is inserted, the inwardly projecting circumferential groove is rolled in the pipe-type housing for fixing the position of the base within the housing.

To position the base within the housing when assembling the shock absorber before the groove is formed in the housing for securing the base in place, in the deformation operation, the transition wall is formed between the normal pipe cross-section and the box-like deformed section providing a stop surface disposed substantially perpendicularly to the pipe axis so that the base, when inserted, rests against the transition wall. As a result, during assembly, it is only necessary to push the base into the normal cross-section of the pipe-type housing until it comes into contact with the transition wall, whereupon the groove in the housing can be formed for securing the base in position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
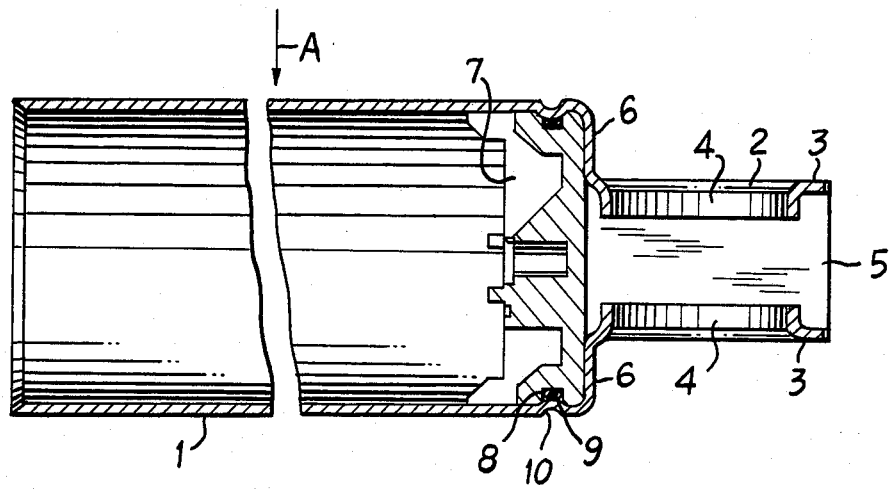
FIG. 1 is an axially extending section through a pipe-type housing for a shock absorber embodying the present invention.
Figure 2:
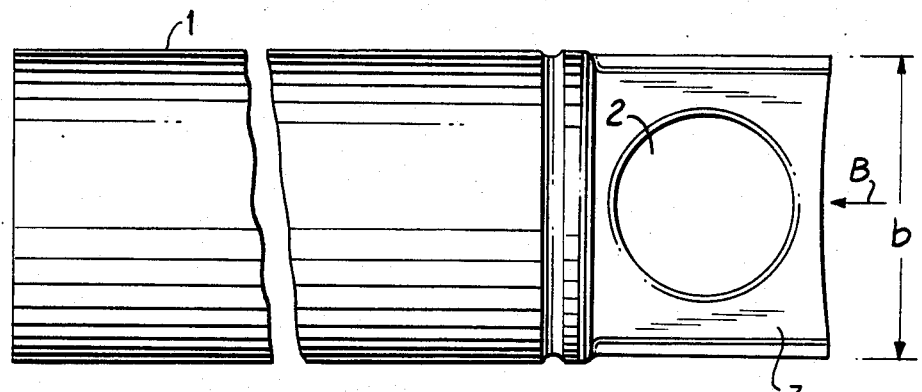
FIG. 2 is a side view of the pipe-type housing taken in the direction of arrow A in FIG. 1.
Figure 3:
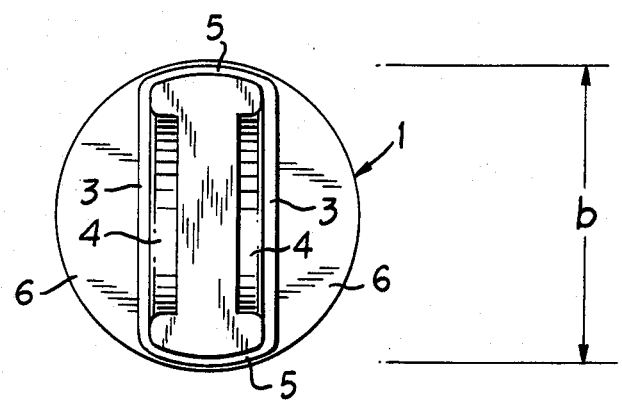
FIG. 3 is an end view of the pipe-type housing taken in the direction of the arrow B in FIG. 2.

In the drawing an axially extending section of steel pipe 1 forms the housing for a shock absorber, not shown in detail, and openings 2 are provided in the housing adjacent one end with the openings serving for a buffer suspension of the shock absorber. As viewed in FIGS. 1 and 2, the pipe section has a first or left end and a second or right end with the openings 2 located adjacent to the second end. An axially extending part of the pipe 1 is deformed inwardly from the second end for a portion of its axial length so that two flat or planar parallel surfaces 3 are formed in spaced relation to one another with one of the openings 2, mentioned above, being formed in each of the surfaces 3. Openings 2 are aligned with one another and flanges 4 project inwardly from each surface 3 toward the other and extend completely around the opening. As a result, the flanges form a short tubular section. The deformed section of the housing at the second end of the pipe section includes a pair of lateral webs 5 each extending between a pair of ends of the surfaces 3. The combination of the lateral webs 5 and the parallel surfaces 3 form a hollow circumferentially closed box section defining generally rectangularly shaped cross-section transverse to the axis of the pipe section. This deformed box section is constructed monolithically with the remainder of the normal cross-section of the pipe 1. As viewed in FIG. 3, the lateral webs 5 are curved slightly transverse to the long direction corresponding to the circumferential curvature of the pipe. The surfaces 3 containing the openings 2 and the lateral web 5 intersect the circular cross-section or normal cross-section of the pipe in a plane extending generally perpendicularly of the axis of the pipe section. The width b of the surfaces 3 of the deformed section of the pipe 1 corresponds approximately to the length of a chord of the normal cross-section of the pipe, note FIG. 3.

In the transition plane between the normal cross-section of the pipe and the deformed box-like cross-section, an inwardly directed transition wall section 6 is formed providing a partial closure across the normal section of the pipe. The wall section 6 extends in a plane generally perpendicular of the axis of the pipe 1. The surface of the wall section 6, facing the left or first end of the pipe in FIG. 1, forms a stop surface for a base inserted into the pipe from the first end. The circumferential surface of the base 7 corresponding generally to the inside surface of the normal cross-section of the pipe 1 contains a circumferentially extending annular groove 8 containing a seal ring 9. After the base is placed into the pipe 1 in bearing contact with the stop surface afforded by the transition wall section 6, a groove 10 is rolled in the pipe corresponding to the groove 8 in the base 7 so that the groove 10 is displaced inwardly into sealing contact with the seal ring 9 and secures the base 7 in position within the pipe.

While specific embodiments of the invention have been shown and described in detail to illustrate the application of the inventive principles, it will be understood that the invention may be embodied otherwise without departing from such principles.

I claim:

1. Pipe-type housing for a shock absorber, such as a telescopic type shock absorber affording vibration dampening and having a fastening eye at one end for receiving a fastening member, comprising an axially elongated pipe member having a first end and a second end, said pipe member being flattened for a part of the axial length thereof from said second end so that said pipe member comprises an axially extending normal cross-sectional part extending from the first end and an axially extending flattened part extending from the second end toward said normal cross-sectional part, said normal cross-sectional part having an inner surface, said flattened part forms an axially extending box-like section having a pair of opposed spaced first surfaces, an opening formed in each of said first surfaces in alignment with the opening in the other said first surface, a flange extending inwardly from each of said openings toward and spaced from the flange in the opening in the opposed said first surface, said flanges extending generally perpendicularly of said first surfaces said flanges encircling said openings as short tubular sections, said pipe member includes a transition wall section extending generally perpendicularly of the axis of said pipe member between and interconnecting said flattened part and said normal cross-sectional part, a base inserted into said pipe member from the first end thereof and sealed within the normal cross-sectional part in contact with the inner surface of said normal cross-sectional part and with said transition wall section, said first surfaces are disposed in parallel relation, a pair of spaced lateral webs extend between the opposite ends of said first surfaces, and, in combination, said first surfaces and said lateral webs form said box-like section as a circumferentially closed hollow box-like section of generally rectangular cross-section transverse to the axis of said pipe member, said first surfaces have a width extending transversely of the axis of said pipe member corresponding to a chord length of said normal cross-sectional part of said pipe member, said transition wall section forms a stop surface facing toward the normal cross-sectional part of said pipe member and said stop surface is disposed perpendicularly to the axis of said pipe member, and said base bears against said stop surfaces.

2. Pipe-type housing for a shock absorber, such as a telescopic type shock absorber affording vibration dampening and having a fastening eye at one end for receiving a fastening member, comprising an axially elongated pipe member having a first end and a second end, said pipe member being flattened for a part of the axial length thereof from said second end so that said pipe member comprises an axially extending normal cross-sectional part and an axially extending flattened part, said flattened part forms an axially extending box-like section having a pair of opposed spaced end surfaces, an opening formed in each of said first surfaces in alignment with the opening in the other said first surface, a flange extending inwardly from each of said openings toward and spaced from the flange in the opening in the opposed said first surface, said flanges encircling said openings as short tubular sections, said pipe member includes a transition wall section extending transversely of the axis of said pipe member between said interconnecting said flattened part and said normal cross-sectional part, a base inserted into and sealed within the normal cross-sectional part in contact with said transition wall section, said first surfaces disposed in parallel relation, a pair of spaced lateral webs extend between the opposite ends of said first surfaces, and, in combination, said first surfaces and said lateral webs form said box-like section as a circumferentially closed hollow box-like section of generally rectangular cross-section transverse to the axis of said pipe member, said first surfaces have a width extending transversely of the axis of said pipe member corresponding to a a chord length of said normal cross-sectional part of said pipe member, said transition wall section forms a stop surface facing toward the normal cross-sectional part of said pipe member and said stop surface is disposed perpendicularly of the axis of said pipe member, and said base bears against said stop surface, said base has a radially outer circumferentially extending surface located adjacent to the inside of the normal cross-sectional part of said pipe member, said circumferential surface of said base has a circumferentially extending annular groove formed therein with a seal ring seated within said groove, and said pipe member in the normal cross-sectional part thereof has an inwardly directed circumferentially extending groove formed corresponding to said groove in said base so that said groove in said pipe member extends into said groove in said base and into sealing contact with said seal ring.

* * * * *